3,075,021
Patented Jan. 22, 1963

3,075,021
DEHALOGENATION OF HALOGENATED AROMATIC COMPOUNDS
John P. Luvisi, Park Ridge, and Louis Schmerling, Riverside, Ill., assignors to Universal Oil Products Company, Des Plaines, Ill., a corporation of Delaware
No Drawing. Filed Oct. 23, 1959, Ser. No. 848,213
2 Claims. (Cl. 260—650)

This invention relates to a novel method for the dehalogenation of halogenated aromatic compounds and more particularly to a method for treating aromatic compounds containing at least one halogen atom on the ring whereby the final product contains at least one halogen atom less than the original halogenated aromatic compound.

The products which are obtained from the process of the present invention will find a wide variety of uses in the chemical field. For example, monochlorobenzene which may be obtained by dehalogenating a dichlorobenzene such as p-dichlorobenzene may be nitrated, the p-nitrochlorobenzene may then be reacted with ammonia to form p-nitroaniline, the latter compound then being reductively alkylated with ketones to form a wide variety of substituted N,N'-dialkyl-p-phenylenediamines, these compounds being useful as antioxidants and antiozonants. In addition to preparing products which are used as intermediates in the preparation of antioxidants and antiozonants of the type hereinbefore set forth, it is also possible to prepare compounds which are useful as intermediates in the preparation of insecticides, those halogenated aromatic compounds containing chlorine being especially effective therefor.

It is therefore an object of this invention to provide a method for preparing aromatic compounds containing substituents which are useful as intermediates in the preparation of other organic chemicals.

A further object of this invention is to provide a method whereby an aromatic compound containing at least one halogen atom on the ring may be at least partially dehalogenated to form aromatic compounds containing at least one halogen atom less than the original compound.

One embodiment of this invention resides in a method for the dehalogenation of an aromatic compound containing at least one halogen atom on the ring which comprises treating said compound with water and a catalyst comprising a metal above hydrogen but below sodium in the electromotive force series at an elevated temperature to form an aromatic compound containing at least one halogen atom less than the original halogenated aromatic compound.

A further embodiment of this invention is found in a method for the dehalogenation of an aromatic compound containing at least one halogen atom on the ring which comprises treating said compound with water and a catalyst comprising a metal above hydrogen but below sodium in the electromotive force series at a temperature in the range of from about 200° to about 400° C. to form an aromatic compound containing at least one halogen atom less than the original halogenated aromatic compound.

Yet another embodiment of the invention resides in a method for the dehalogenation of an aromatic compound containing at least one halogen atom on the ring which comprises treating said compound with water and iron at a temperature in the range of from about 200° to about 400° C. to form an aromatic compound containing at least one halogen atom less than the original halogenated aromatic compound.

A specific embodiment of the invention resides in a method for the dechlorination of an aromatic compound which comprises treating p-dichlorobenzene with water and a catalyst comprising a metal above hydrogen but below sodium in the electromotive force series at a temperature in the range of from about 200° to about 400° C. to form an aromatic compound containing at least one halogen atom less than the original halogenated aromatic compound.

A more specific embodiment of the invention resides in a method for the dechlorination of p-dichlorobenzene which comprises treating said dichlorobenzene with water and a catalyst comprising magnesium at a temperature in the range of from about 250° to about 350° C. to form benzene and chlorobenzene.

Other objects and embodiments referring to alternative halogenated aromatic compounds and to alternative metals falling within the aforementioned limits of the electromotive force series will be found in the following further detailed description of the invention.

As hereinbefore set forth it has now been found possible to dehalogenate an aromatic compound containing at least one halogen atom on the ring by treating said compound with water and a catalyst comprising a metal which lies above hydrogen but below sodium in the electromotive force series to obtain an aromatic compound containing at least one halogen atom less than the original compound. Aromatic compounds containing halogen substituents on the ring which may be dehalogenated according to the process of this inveniton include those containing only carbon, hydrogen and halogen atoms (i.e., halogenated aromatic hydrocarbons) having an atomic weight of between 35 and 127 (i.e. chlorine, bromine and iodine) such as chlorobenzene, bromobenzene, iodobenzene, o-chlorotoluene, o-bromotoluene, o-iodotoluene, m-chlorotoluene, m-bromotoluene, m-iodotoluene, p-chlorotoluene, p-bromotoluene, p-iodotoluene, o-chloroethylbenzene, o-bromoethylbenzene, o-iodoethylbenzene, m-chloroethylbenzene, m-bromoethylbenzene, m-iodoethylbenzene, p-chloroethylbenzene, p-bromoethylbenzene, p-iodoethylbenzene, o-chloropropylbenzene, o-bromopropylbenzene, o-iodopropylbenzene, m-chloropropylbenzene, m-bromopropylbenzene, m-iodopropylbenzene, p-chloropropylbenzene, p-bromopropylbenzene, p-iodopropylbenzene, o-chloroisopropylbenzene, o-bromoisopropylbenzene, o-iodoisopropylbenzene, m-chloroisopropylbenzene, m-bromoisopropylbenzene, m-iodoisopropylbenzene, p-chloroisopropylbenzene, p-bromoisopropylbenzene, p-iodoisopropylbenzene, 4-chloro-o-xylene, 4-chloro-m-xylene, 2-chloro-p-xylene, 3-chloro-p-xylene, 4-bromo-o-xylene, 4-bromo-m-xylene 2-bromo-p-xylene, 3-bromo-p-xylene, 4-iodo-o-xylene, 4-iodo-m-xylene, 2-iodo-p-xylene, 3-iodo-p-xylene, o-dichlorobenzene, o-dibromobenzene, o-diiodobenzene, m-dichlorobenzene, m-dibromobenzene, m-diiodobenzene, p-dichlorobenzene, p-dibromobenzene, p-diodobenzene, dihaloalkylbenzenes, 1,2,3-trichlorobenzene, 1,2,3-tribromobenzene, 1,2,3-triiodobenzene, 1,2,4-trichlorobenzene, 1,2,4-tribromobenzene, 1,2,4-triiodobenzene, 1,2,5-tribromobenzene, 1,2,5-triiodobenzene, 1,3,5-trichlorobenzene, 1,3,5-tribromobenzene, 1,3,5 - triiodobenzene, trihaloalkylbenzenes, tetrahalo- and pentahalo-benzenes and alkylbenzenes, hexahalobenzenes, 1-chloronaphthalene, 1-bromonaphthalene, 1-iodonaphthalene, 2-chloronaphthalene, 2-bromonaphthalene, 2-iodonaphthalene, 1,2-dichloronaphthalene, 1,2-dibromonaphthalene, 1,2-diiodonaphthalene, 1,4-dichloronaphthalene, 1,4-dibromonaphthalene, 1,4-diiodonaphthalene, 1,8-dichloronaphthalene, 1,8-dibromonaphthalene, 1,8-diiodonaphthalene, etc., the halogenated and polyhalogenated anthracenes, chrysenes, pyrenes, phenanthrenes, naphthacenes, biphenyls, etc. It is to be understood that the aforementioned halogenated aromatic compounds are only representatives of the class of compounds and that the present invention is not necessarily limlted thereto.

The dehalogenation of the aforementioned halosubstituted aromatic compounds is effected by treating the compound with water, preferably present in an amount in excess over the halo substituted aromatic compound, in the presence of a catalyst which comprises a metal capable of displacing hydrogen from the water, said metal being above hydrogen but below sodium in the electromotive force series. Examples of such metals include lead, tin, nickel, cobalt, cadmium, iron, chromium, zinc, manganese, aluminum and magnesium.

The dehalogenation of the halogenated aromatic compounds is effected at elevated temperatures and pressures, the temperatures being in the range of from about 200° to about 400° C. or higher, preferably in a range of from about 250° to about 350° C., and at pressures ranging from about atmospheric to about 300 atmospheres or more. The pressure at which the reaction occurs may be effected by the introduction of an inert gas such as nitrogen into the reaction vessel.

The process of the present invention may be effected in any suitable manner and may comprise either a batch or a continuous type operation. For example, when a batch type operation is used a quantity of the starting materials comprising the particular aromatic compound containing at least one halogen substituent on the ring is placed in a suitable apparatus such as a rotating autoclave along with the particular catalyst comprising a metal above hydrogen but below sodium in the electromotive force series. In addition the water is also added, following which the apparatus is sealed, brought to a superatmospheric pressure by the introduction of an inert gas, if desired, and heated to the reaction temperature. Upon completion of the desired residence time the apparatus and contents thereof are allowed to cool to room temperature and the dehalogenated product is extracted with a substantially inert solvent such as pentane, benzene, toluene, etc., the catalyst is separated therefrom and the pentane or other solvent extract is subjected to fractional distillation, crystallization, etc., whereby the desired dehalogenated product is recovered therefrom.

The reaction may also be effected in a continuous type operation. When this type of operation is used the halogen substituted aromatic compound is continuously charged to the reaction zone at a liquid hourly space velocity (volume of charge per volume of catalyst per hour) in the range of from about 0.05 to about 20 or more and preferably in a range of from about 0.5 to about 5, said reaction zone being maintained at the proper operating conditions of temperature and pressure. The reaction zone may comprise an unpacked vessel or coil or may be lined with an adsorbent packing material such as fire brick, alumina, dehydrated bauxite and the like. The water is also continuously charged to the reaction zone through a separate line or, if so desired, it may be admixed with the halogen substituted aromatic compound before entry into said reaction zone and the resulting mixture charged there to in a single stream. The physical composition of the catalyst which is used in this reaction lends itself quite readily to a fixed bed type of reaction. When this method of operation is used the catalyst is disposed as a fixed bed in the reaction zone while the reactants pass through said bed in either an upward or downward flow. Another type of operation which may be used is the moving bed type in which the catalyst and the reactants pass either concurrently or countercurrently to each other through said zone. Alternatively the catalyst may be admixed with the halogen substituted aromatic compound before entry into said zone and carried into the zone as a slurry. Upon completion of the desired residence time the dehalogenated aromatic compound is continuously withdrawn from the reactor effluent, purified and recovered by conventional means, while the residual effluent may be recycled to form a portion of the feed stock. Inasmuch as the unreacted halo substituted aromatic compound may be recovered in a substantially quantitative amount, and subsequently recycled for further conversion, the present reaction is economically attractive as a commercial method for obtaining the desired products.

The following examples are given to illustrate the process of the present invention, which, however, are not intended to limit the generally broad scope of the present invention in strict accordance therewith.

*Example I*

A mixture of 29 g. of p-dichlorobenzene and 200 g. of water was placed in the glass liner of a rotating autoclave having a capacity of 850 cc. along with 10 g. of magnesium. The glass liner was sealed into the autoclave and nitrogen pressed in until an initial pressure of 30 atmospheres had been reached, the nitrogen being added chiefly for the purpose of keeping the reactants in the liner as much as possible during the heating period. The autoclave was slowly heated to a temperature of 300° C. and maintained thereat for a period of 10 hours during which time the maximum pressure reached 183 atmospheres. At the end of this time the autoclave and contents thereof were cooled to room temperature, the final pressure at room temperature being 50 atmospheres. The excess pressure was vented and the reaction products comprising 213 g. inside and outside the liner were recovered, combined and extracted with pentane. The pentane extract was separated from the water and catalyst and subjected to fractional distillation, the cuts boiling at 80–81° C. and 131–133° C., comprising a 25% yield of benzene and an 18% yield of chlorobenzene respectively, were separated and recovered therefrom.

*Example II*

A mixture of 29 g. of p-dichlorobenzene and 200 g. of water was placed in the glass liner of a rotating autoclave along with 10 g. of iron metal powder which had previously been reduced by hydrogen. The liner was sealed into the autoclave and nitrogen pressed in until an initial pressure of 30 atmospheres had been reached. The autoclave was then heated to a temperature of 300° C. and maintained thereat for a period of 10 hours during which time the maximum pressure rose to 108 atmospheres. At the end of the residence time the autoclave and contents thereof were cooled to room temperature, the final pressure at room temperature being 30 atmospheres. The excess pressure was vented and the reaction product comprising 219 g. was recovered and extracted with pentane. The pentane extract was separated from the water and catalyst and subjected to fractional distillation, the cuts boiling at 80–81° C. and 131–133° C., comprising a 14% yield of benzene and an 18% yield of chlorobenzene respectively, were separated and recovered.

*Example III*

Forty-seven grams of p-dibromobenzene along with 200 cc. of water and 10 g. of zinc are placed in a rotating autoclave similar to that used in the above examples. The liner is sealed into the autoclave and nitrogen pressed in until an initial pressure of approximately 30 atmospheres is reached. The autoclave is then slowly heated to a temperature of 300° C. and maintained thereat for a period of 10 hours. At the end of this time the autoclave and contents thereof are allowed to cool to room temperature, the excess pressure is vented and the reaction products both inside the liner and outside the liner are recovered and combined. The combined products are then extracted with pentane, the pentane extract is separated from the water and catalyst and subjected to fractional distillation, the cuts boiling at 80–81° C. and 155–157° C., comprising benzene and bromobenzene respectively, are separated and recovered.

*Example IV*

A mixture of 25 g. of p-chlorotoluene and 200 g. of water along with 10 g. of tin are placed in an autoclave and subjected to the same conditions hereinbefore set forth in the preceding examples, that is, a temperature of about 300° C., an initial pressure of 30 atmospheres of nitrogen and a residence time of approximately 10 hours. At the end of this time the autoclave and contents thereof are allowed to cool to room temperature, the excess pressure is vented and the reaction product, after recovery, extraction with pentane and separation from the water and catalyst is subjected to fractional distillation. The cut boiling at approximately 110° C., comprising toluene, is separated and recovered therefrom.

*Example V*

In this example a mixture of 39 g. (0.2 mole) of 1,8-dichloronaphthalene, 200 cc. of water and 10 g. of cadmium is treated in a manner similar to that set forth in the above examples. At the end of the desired residence time the autoclave and contents thereof are cooled to room temperature, the excess pressure is vented and the reaction product after recoverey and extraction with pentane is separated from the water and catalyst. The pentane extract is subjected to fractional distillation, the cuts boiling at 218° C. and 250–260° C., comprising naphthalene and 1-chloronaphthalene respectively, are separated and recovered therefrom.

We claim as our invention:

1. A method for the dehalogenation of a halo substituted aromatic compound containing at least one halogen atom on the ring which comprises treating said compound with water in the presence of a catalyst comprising magnesium at a temperature in the range of from about 200° to about 400° C. to form an aromatic compound containing at least one halogen atom less than the original halogenated aromatic compound.

2. A method for the dechlorination of p-dichlorobenzene which comprises treating said dichlorobenzene with water in the presence of a catalyst comprising magnesium at a temperature in the range of from about 200° to about 400° C. to form an aromatic compound containing at least one chlorine atom less than the original p-dichlorobenzene.

References Cited in the file of this patent

UNITED STATES PATENTS

| | | |
|---|---|---|
| 2,726,271 | Troyan | Dec. 6, 1955 |
| 2,826,617 | Redman et al. | Mar. 11, 1958 |
| 2,866,828 | Crowder et al. | Dec. 30, 1958 |
| 2,886,605 | McClure et al. | May 12, 1959 |
| 2,943,114 | Redman et al. | June 28, 1960 |

OTHER REFERENCES

Mellor: "A Comprehensive Treatise on Inorganic and Theoretical Chemistry," Longmans, Green and Co., London, publ. 1923, vol. 1, pages 134–5 and 493.

Jones: "Inorganic Chemistry," The Blakiston Co., Philadelphia, publisher, 1947, pages 100–2.

Wagner et al.: "Synthetic Organic Chemistry," John Wiley & Sons, New York, New York (1953), page 8.